United States Patent [19]

Nacman

[11] Patent Number: 5,241,252
[45] Date of Patent: Aug. 31, 1993

[54] MOTOR DRIVE SYSTEM FOR A POLYGON SCANNER

[75] Inventor: Aron Nacman, Rochester, N.Y.

[73] Assignee: Xerox Corporation, Stamford, Conn.

[21] Appl. No.: 956,823

[22] Filed: Oct. 5, 1992

Related U.S. Application Data

[63] Continuation of Ser. No. 700,675, May 15, 1991, abandoned.

[51] Int. Cl.$^5$ .................................................. G06F 5/06
[52] U.S. Cl. ........................................ 318/701; 318/721; 358/296
[58] Field of Search ............... 318/696, 700, 702, 712, 318/715, 721, 798, 799, 719; 350/6.1, 6.5, 6.7; 356/6, 9, 16, 17; 250/216, 234, 236, 559, 561; 355/57, 14 E; 358/287, 296, 300, 310

[56] References Cited

U.S. PATENT DOCUMENTS

| | | | |
|---|---|---|---|
| 3,905,705 | 9/1975 | Petrohilos | 350/6.1 |
| 4,140,903 | 2/1989 | Clark | 250/236 |
| 4,143,311 | 3/1979 | Lee | 318/702 |
| 4,160,939 | 7/1979 | Damouth et al. | 318/723 |
| 4,302,782 | 11/1981 | Gunning et al. | 358/296 |
| 4,349,847 | 9/1982 | Traino | 358/293 |
| 4,707,709 | 11/1987 | Tsilibes | 358/310 |
| 4,710,691 | 12/1987 | Bergstrom et al. | 318/696 |
| 4,807,156 | 2/1989 | Parisi | 358/287 |
| 5,006,721 | 4/1991 | Cameron et al. | 250/561 |

Primary Examiner—William M. Shoop, Jr.
Assistant Examiner—John W. Cabeca

[57] ABSTRACT

A scanning polygon in a ROS system in driven by a motor whose speed is varied in response to desired changes in the resolution of the scan line being formed at a photosensitive surface. The motor of choice is a 2-phase AC hysteresis synchronous motor which is run by square wave input signals to each winding which 90° out of phase. The motor input signals are at a power level which is variable in response to changes in the frequency of the square wave inputs. The power level variations are applied at the wave front transition so as to prevent the motor from jumping out of synchronism at these points, thus enabling smooth motor operation.

3 Claims, 5 Drawing Sheets

MOTOR DRIVE SYSTEM FOR A POLYGON SCANNER

This is a continuation of application Ser. No. 07/700,675, filed May 15, 1991 now abandoned.

BACKGROUND AND PRIOR ART STATEMENT

Summary of the Invention

The present invention relates generally to a laser printing system using a rotating polygon to scan a modulated beam across a photosensitive surface, and, more particularly, to a programmable drive means for changing motor speeds in response to changes in image resolution requirements.

Electronic copiers or printers of the type which use a raster output scanner (ROS) to form images on a moving photosensitive medium are well known and commercially available. In a typical system, a gas or laser diode is pulsed and its output modulated in accordance with data information to be printed on a photosensitive medium. The modulated laser beam output is directed to a rotating optical scanner, conventionally a multifaceted polygon element, driven by a motor, which scans the modulated beams across the medium, which can be, for example, a charged photoreceptor belt or drum. The modulated scanning beam exposes the belt or drum in an image-wise pattern which can subsequently be developed and a developed image is then transferred to an output sheet.

In the ROS scanning system, the motor drive for the scanning polygon is a critical component since output copy quality is directly proportional to the smoothness of motor operation. It has been found that for accurate speed control at relatively high speeds, an AC hysteresis synchronous motor for some systems, is preferable to the DC drive motors which are conventionally used to drive scanning polygons at lower operational speeds. The AC motor can be driven by applying either sine wave signals, or square wave signals to the motor windings. U.S. Pat. No. 4,349,847 is representative of a scanning system in which a hysteresis synchronous polygon motor is driven by sine wave inputs. The main disadvantages of the sine wave drive is that it must be enabled in combination with a tuned circuit. And, since the motor is an inductive load, it is necessary to use power factor correction capacitors across the load; necessary, because the drive transistors driving the motor are operating in the active region, and dissipate too much power with a purely inductive load. The power factor correction capacitors are chosen to have a value dependent on the frequency of the sine wave inputs. If the frequency changes by more than a small amount, the capacitor value must be changed to compensate, else the drive transistors will fail. Since these capacitors are relatively large, accommodating more than a small range of motor speeds becomes very difficult.

Use of square wave input signals to the motor does not require use of the power factor of correction capacitor, since the drive transistors are operated only in the cutoff and saturation regions, where power dissipation levels are low. The disadvantage of using the square wave drive is that the motor tends to jump out of sync at the wave front transitions, and the power must therefore be adjusted at each desired frequency change in order to maintain smooth motor operation. Thus, while square wave drives have been used in scanning systems to compensate for instantaneous speed variations known as "hunting" (see U.S. Pat. No. 4,140,903) it has heretofore not been known to drive a polygon motor with square wave signals with various, relatively large, frequency input changes to obtain a desired speed change. The advantage of a square wave drive system with proper power adjustment is that the ROS can be operated so as to enable a continuously variable resolution of the scan beams at the photosensitive medium in a slow scan direction, (the direction of the photoreceptor motion) with good copy quality.

According to a first aspect of the present invention, a square wave polygon motor drive system is disclosed in an "open loop" circuit in which a crystal oscillator is used to provide two stable reference square waves. The frequency of the square waves is divided down and a 90° phase shift established. A divide by n counter provides the divided down frequency signals to provide the final square wave outputs 90° out of phase and at a power level determined by a programmable power supply. According to a second aspect of the invention, automatic power adjustment is provided by providing a look-up table that maps the desired motor RPM into a power level for an optimum motor performance.

Summarizing both aspects of the invention, the drive signals (phases 1 and 2) to the motor need to be changed in frequency and in amplitude to obtained desired motor performance.

More particularly, the present invention relates a motor speed control system for controlling the rotational speed of a polygon adapted to scan a reflected beam of radiation over the surface of a photosensitive scanning medium, said system comprising:

an AC hysteresis synchronous motor coupled to said polygon and adapted to drive said polygon at said rotational speed, means for varying the frequency of square wave signal applied to said motor in response to signals representing changes in polygon rotation speed and means for adjusting the power level of said square wave signals in response to said square wave signal frequency variations whereby the frequency and amplitude of said square wave signals are varied to provide smooth motor speed transitions at the square wave transmission points.

DESCRIPTION OF THE INVENTION

Figure 1:
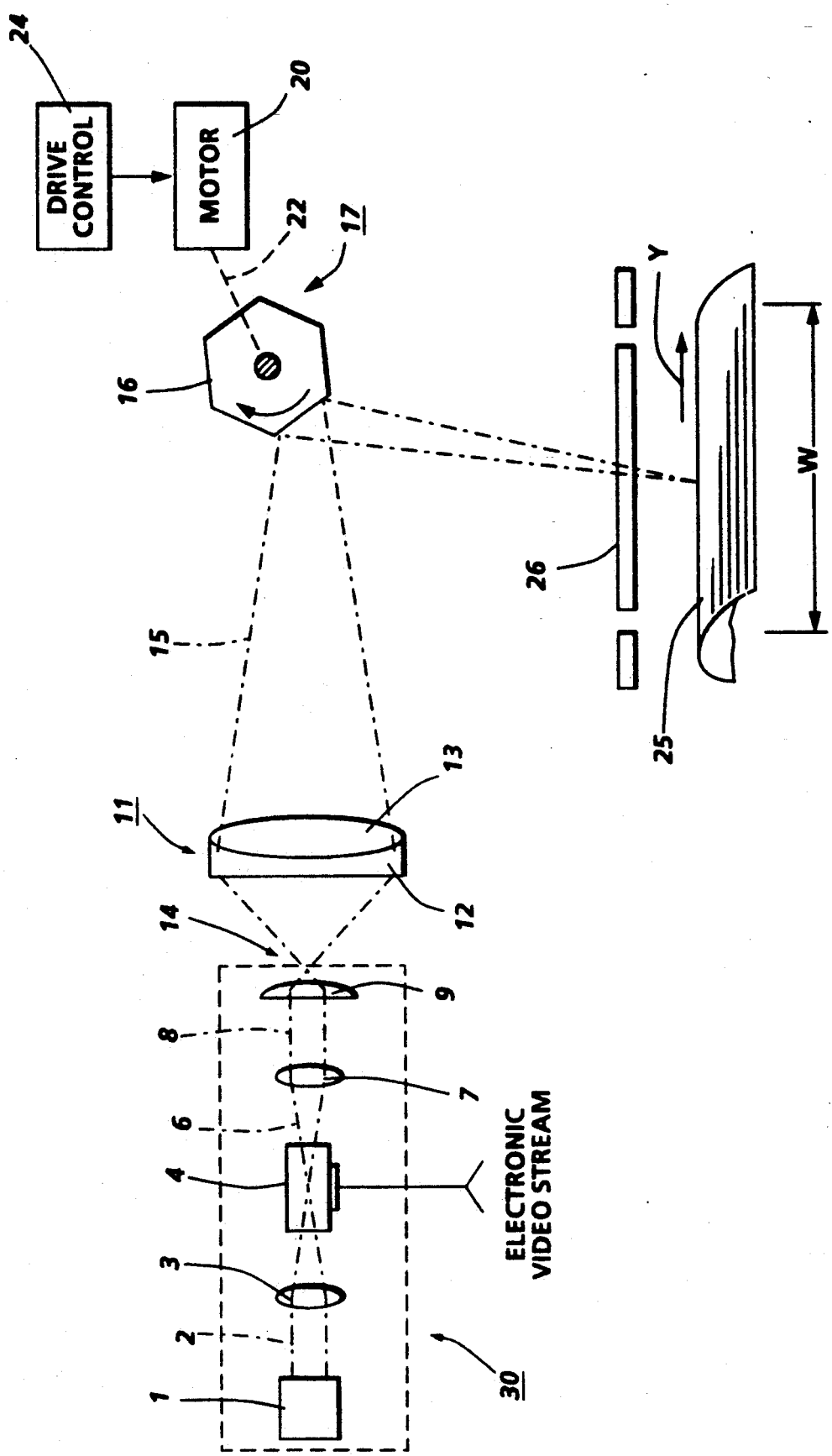
FIG. 1 illustrates a simplified representation of the optical and recording portions of a laser ROS printing system in which the polygon motor is driven by the drive circuit of the present invention.

A light source 1 provides the original light beam for utilization by the printing system. The light source 1 is preferably a laser, such as helium-cadmium or helium-neon laser, which generates a collimated beam of monochromatic light 2. The monochromatic light beam is focused by spherical leans 3 onto modulator 4, the light beam 2 being modulated in conformance with the information contained in a video signal input.

Modulator 4 may be any suitable modulator or modulator/deflector for converting the video information to the form of a modulated light beam 6 at the output of the modulator 4. By means of the modulator 4, typically an acousto-optic modulator, the information within the video signal is represented by the modulated light beam 6.

The light beam 6 is incident on spherical lens element 7 which collimates the incident beam 6. The collimated light output beam 8 from lens 7 is then directed to cylindrical lens 9 which spreads the beam energy in the scan (or tangential) direction and directs the beam to imaging lens 11. Imaging lens 11 produces a beam 15 which impinges upon and illuminates a plurality of contiguous facets 16 of the scanning polygon 17 as shown.

The rotational axis of polygon 17 is orthogonal to the plane in which light beam 6 travels. The facets 16 of the polygon 17 are mirrored surfaces for the reflection of any illuminating light impinging upon them. With the rotation of the polygon 17, light beams are reflected from the illuminated facets and turned through a scan angle to enable flying spot scanning.

Polygon 17 is continuously driven by an AC hysteresis synchronous motor 20 via a drive shaft 22. A drive control system 24, described in further detail below, is provided to control the operation of motor 20.

Medium 25 may be a xerographic drum (a portion of the surface is illustrated) which rotates consecutively through a charging station (not shown) comprising a corona discharge device, an exposure station where the beam from the rotating polygon 17, passing through a cylindrical lens 26 would traverse a scan width W on the drum in the direction of arrow Y, (the fast scan direction), a developing station, and a transfer station (not shown) where copy paper is passed in contact with the drum and receives an electrostatic discharge to induce a transfer of the developed image from the drum to the copy paper.

Usable images are provided in that the information content of the scanning spot is represented by the modulated or variant intensity of light respective to its position within the scan width W. As the spot traverses a charged surface, the spot dissipates the electrostatic charge in accordance with its light intensity. The electrostatic charge pattern thus produced is developed in the developing station and then transferred to the final copy paper. The resolution of the image formed by the scanned light pattern in the slow scan direction (direction of rotation of drum 25) as will be shown below, is a function of the operating speed of the motor.

Figure 2:
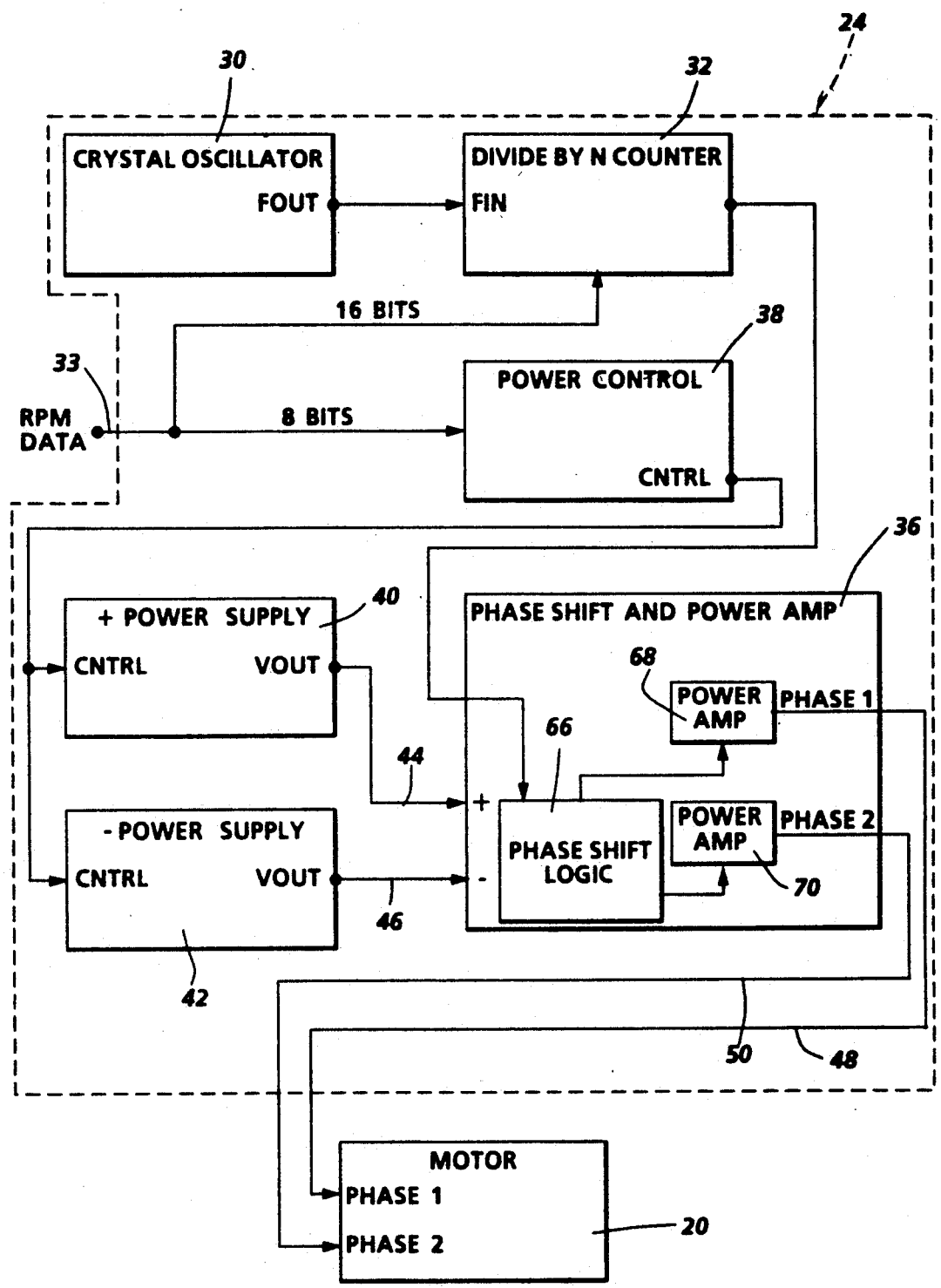
FIG. 2 is a block diagram of the drive system shown in FIG. 1.

Referring now to FIG. 2, a block diagram of drive control system 24 as shown. Crystal oscillator 30 provides a stable reference square wave output. Oscillator 30, in a preferred embodiment, operates at a frequency of 14 mhz which is much higher than the desired motor operating frequency. The oscillator output is divided down by divide by n counter 32. Counter 32 is preset along input lead 33 to a count representing the frequency required to produce a desired slow scan resolution.

Counter 32 in a preferred embodiment provides 16 bits (64K levels) of addressability. The output of counter 32, set at 8× the final motor frequency, is sent to a phase shift and power amplification circuit 36. The input on lead 33 (the 8 most significant bits) is also sent to power control circuit 38 which provides 8 bits (256 levels) of addressability for adjustment of the drive power to the motor. The analog output from power control circuit 38 programs a positive power supply 40 and a negative power supply 42 which supply positive and negative power signals to phase shift and power amp circuit 36 along leads 44, 46 respectively. Circuit 36, utilizing phase shift logic circuit 66 and power amplifiers 68 and 70, produces amplified square wave outputs along leads 48, 50 which are 90° out of phase and at power levels determined by supplies 40, 44 and at a divided down frequency. The rotational frequency of motor 20 is given by RPS=f where RPS is the rotational frequency in revolutions per second, and f is the frequency of the motor drive signals in hertz as applied to the motor.

From the above description, and according to a first aspect of the present invention, motor speed, and hence slow scan resolution can be adjusted by changing the counter 32 address at lead 33. The data signal on input lead 33 is also sent to power control circuit 38 to adjust to adjust the drive power level that supplies 40, 42. Thus, as the amplified drive signals are coupled into motor 20 windings at a given changed frequency, the power levels will be adjusted as well so as to prevent the motor from jumping out of sync at the wave front transition points.

Figure 3:
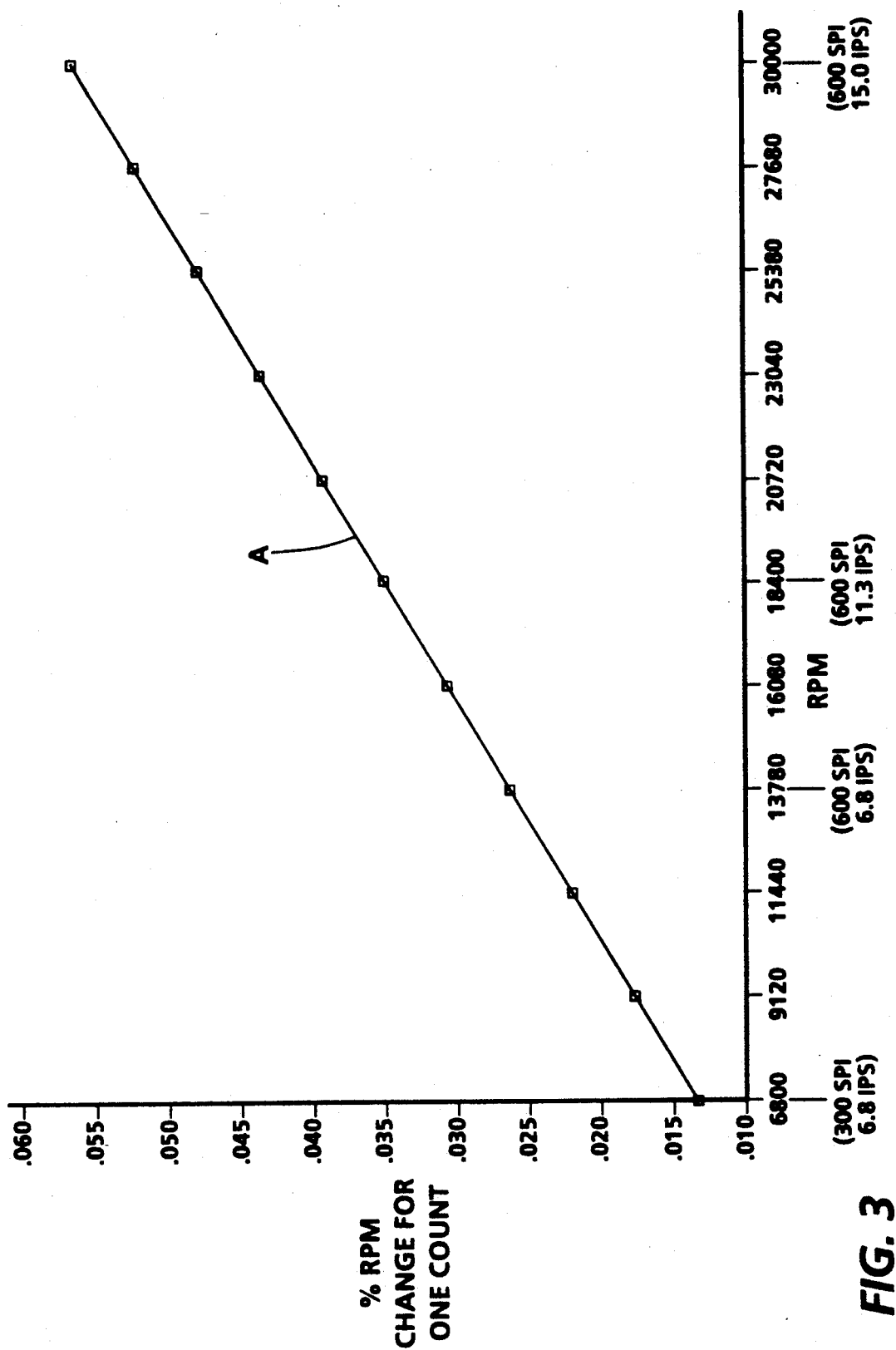
FIG. 3 is a plot of motor speed versus percent RPM change for a one count change to the divide by n circuit.
Figure 4:
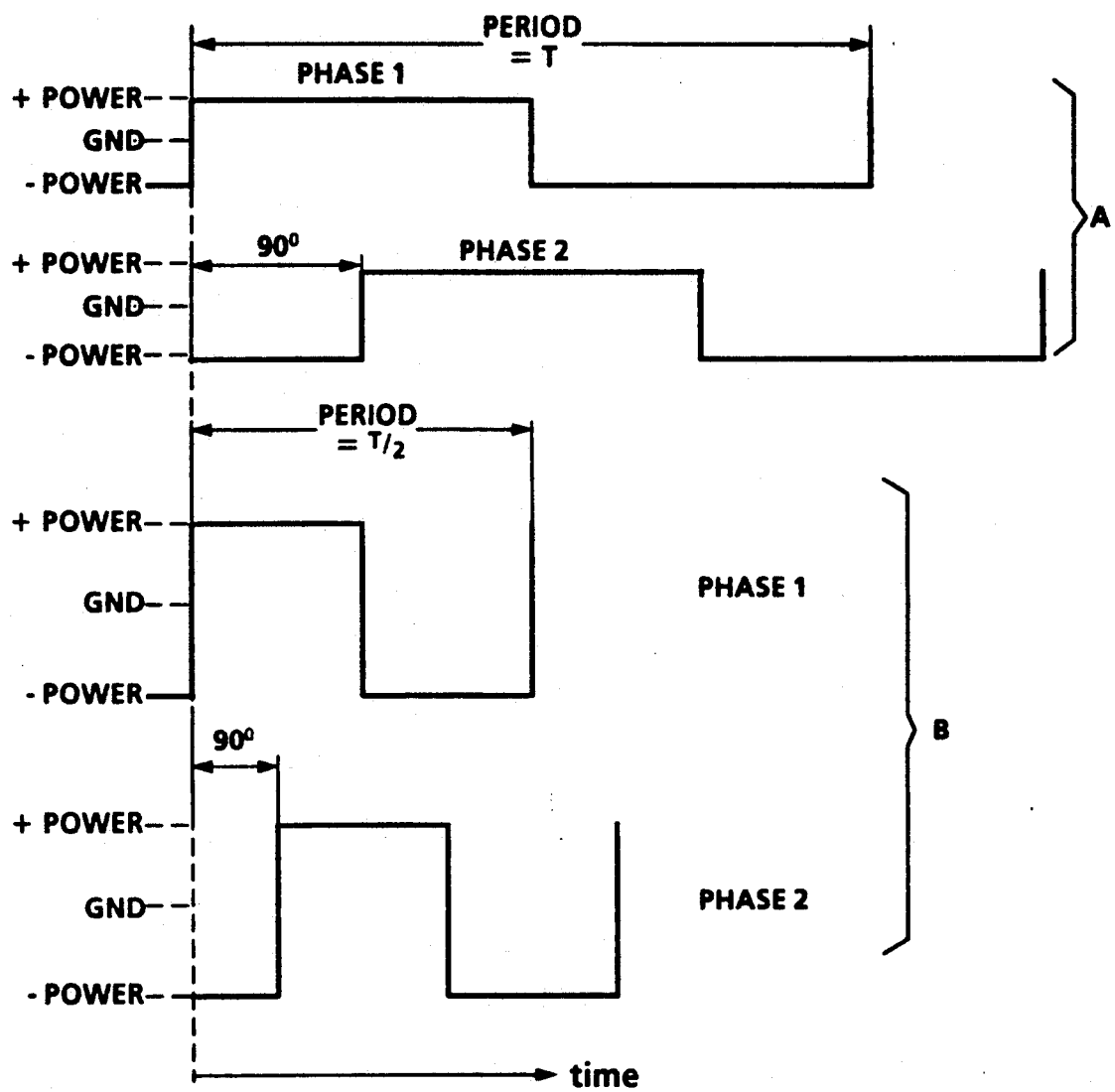
FIG. 4 shows the drive signal to the polygon motor at a first RPM and a second (2×) RPM.

The graph shown in FIG. 3 demonstrates the changes in motor speed which result in a change of one count to the input to counter 32. The motor speed in RPM forms the abscissa, while the ordinate is the percent RPM change for each one count input change to the divide-by n counter. The change is linear for different motor speeds and resolutions as shown by the linear plot A. As an example, for a system where polygon 20 is driven at 6800 RPM, and drum 25 has a process speed of 6.8 inches per second, and the image is scanned at a resolution of 300 spi, a decrease of one count in counter 32 input will increase motor 20 speed by approximately 0.0125 percent. If the resolution is to double to 600 spi at the same process speed, the motor speed is doubled to 13600 RPM at which speed each count change to counter 32 causes a 0.025 percent increase in motor speed with a corresponding increase in power level of the square wave input signals. FIG. 4 shows the drive signals to the motors: set A represents signals at 6800 RPM. and set B at 13,600 RPM. As seen, as the RPM increases and, the drive frequency and drive power (amplitude) also increase. Depending upon a process speed, different points along plot A will be at different resolutions and will have different values of percent RPM change. Two such values are shown at 18,400 RPM, and 30,000 RPM. Both of these are at 600 spi resolution. It is of course understood that the crystal oscillator 30 upper frequency may have to be increased if the system is to operate at the higher process/resolution ranges.

Figure 5:
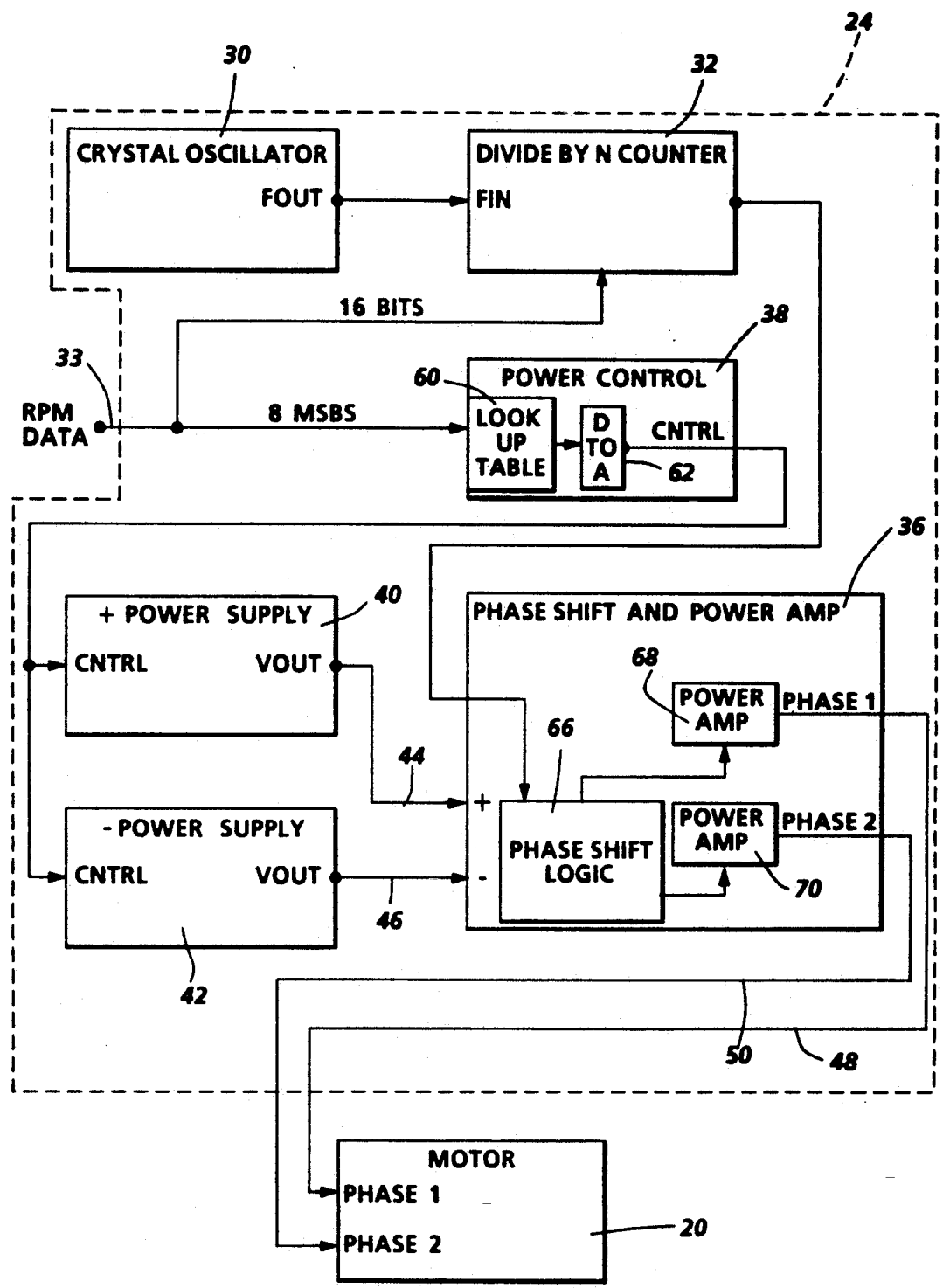
FIG. 5 is an alternative embodiment of the block diagram shown in FIG. 2.

According to a second aspect of the invention, the power adjustment can be provided automatically by incorporating a look-up table in power control circuitry 38. As shown in FIG. 5, the 8 most significant bits from the address signal and input line 33 to counter 32 are sent to look-up Table 60. The data for the look-up table is determined either experimentally or mathematically to provide optimum power levels for each motor RPM setting. The relationship between the rotational frequency of the motor (RPS) and the power (P) as applied to the drive signals measured in watts is given by;

g(RPS)=P where g is a function of look-up Table 60 that maps the rotational frequency into the proper power level to be applied to the motor drive signals (Phase 1 and 2). Thus, 8 bits out of the look-up Table would be the data input to digital ananlog (D to A) converter 62. The analog output of converter 62 is used to program the power supplies 40, 42.

While the invention has been described with reference to the structure disclosed, it will be appreciated that numerous changes and modifications are likely to occur to those skilled in the art, and it is intended to cover all changes and modifications which fall within the true spirit and scope of the invention.

I claim:

1. An open loop motor speed control system for controlling the rotational speed of a polygon adapted to scan a reflected beam of radiation over the surface of a photosensitive medium in the fast scan direction, said system comprising:

an AC hysteresis synchronous motor coupled to said polygon and adapted to drive said polygon at said rotational speed, means for varying the frequency of square wave signals applied to said motor in response to signals representing changes in said rotational speed of said polygon, said varying means including square wave generator means for providing a stable square wave output at a first frequency which is much higher than the desired final motor frequency and counter circuit means for receiving said square wave generator outputs and dividing down said square wave generator outputs as a function of the polygon rotational speed input data signals, and means for adjusting the power level of said square wave signals in response to said square wave signal frequency variations whereby the amplitudes of said square wave signals are varied to provide smooth motor speed transitions at the square wave transmission points, said means for adjusting the power level includes a first positive and a second negative power supply, a power control circuit for providing analog output control signals to said positive and negative power supplies, and phase shift and power amplification circuit means adapted to combine the outputs of said counter circuit means and said positive and negative power supplies to produce two output square signals which are 90° out of phase and at a divided down final motor frequency and having amplitudes which are adjusted to the changes in the motor frequency so as to maintain synchronous motor operation.

2. The control system of claim 1, wherein said power control circuit includes a look up table having values stored therein which are representative of drive power requirements corresponding to specified changes in said motor frequency.

3. The control system of claim 2, wherein the relationship between the rotational frequency of the motor (RPS) and the power (P) as applied to the drive signals, measured in watts, is given by the expression g (RPS)=P where g is a function of said lookup table values that maps the rotational frequency into the proper power level to be applied to the motor drive signals and P is the power level, in watts.

* * * * *